United States Patent [19]

Sloan et al.

[11] Patent Number: 4,979,453
[45] Date of Patent: Dec. 25, 1990

[54] FLOATING DOCK SYSTEM

[75] Inventors: Stephen Sloan, New York, N.Y.; Richard B. Easson, Ridgefield, N.J.

[73] Assignee: Infinity Dock Systems, New York, N.Y.

[21] Appl. No.: 295,060

[22] Filed: Jan. 6, 1989

[51] Int. Cl.⁵ .................................... B63B 35/44
[52] U.S. Cl. ..................................... 114/263
[58] Field of Search ............... 114/263, 264, 265, 266, 114/122, 126; 405/218, 219

[56] References Cited

U.S. PATENT DOCUMENTS

| | | | |
|---|---|---|---|
| 2,561,539 | 7/1951 | Seward | 114/122 |
| 2,857,872 | 10/1958 | Usab | 114/266 |
| 3,589,324 | 6/1971 | Hoffman | 114/122 |
| 3,659,540 | 5/1972 | Toby et al. | 114/266 |
| 3,659,546 | 5/1972 | Miklos | 114/263 |
| 3,831,538 | 8/1974 | Meeusen | 114/263 |
| 4,070,980 | 1/1978 | Shorter | 114/263 |
| 4,252,470 | 2/1981 | Sluys | 114/263 |
| 4,493,283 | 1/1985 | Elliott | 114/263 |
| 4,505,619 | 3/1985 | Sargent | 114/263 |
| 4,905,622 | 3/1990 | Silvia | 114/126 |

Primary Examiner—Sherman Basinger
Assistant Examiner—Stephen P. Avila
Attorney, Agent, or Firm—William G. Todd

[57] ABSTRACT

Directed to a floating dock system of improved stability and load carrying capacity with a clean, uncluttered profile. The system is made of rectangular, modular main dock units having preferably cylindrical steel tanks or floats rigidly attached in parallel relation and supporting a deck structure. Individual units are attached together by hinges at the ends and have finger pier units, also preferably having cylindrical steel tanks or floats supporting a deck structure attached along the sides of the main dock units, as by hinges, so as to form mooring slips therebetween. The main dock units may have a utility trench built into the decking therealong which permit inspection thereof and may have transformers mounted on each unit to provide power sources of equivalent capacity along the entire main dock system.

11 Claims, 9 Drawing Sheets

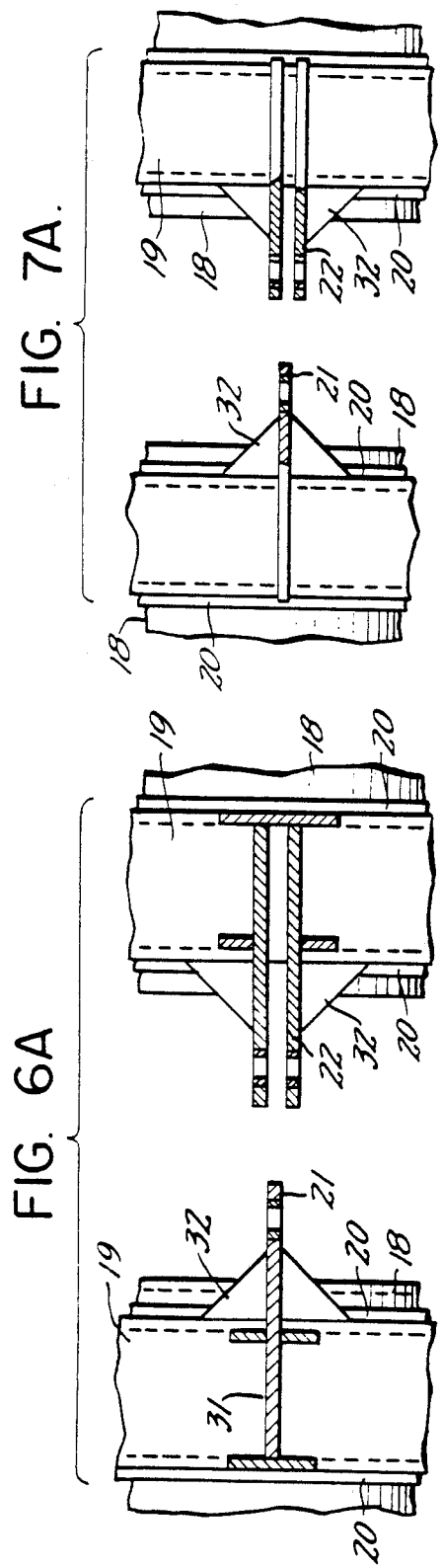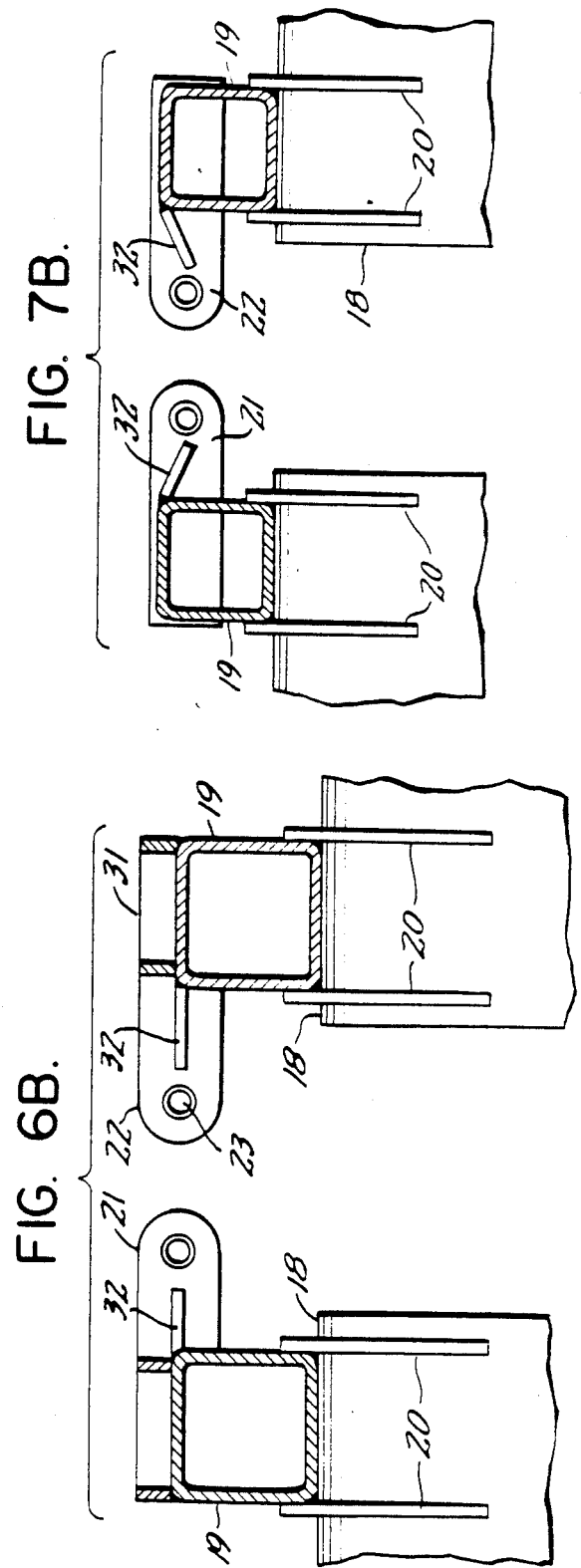

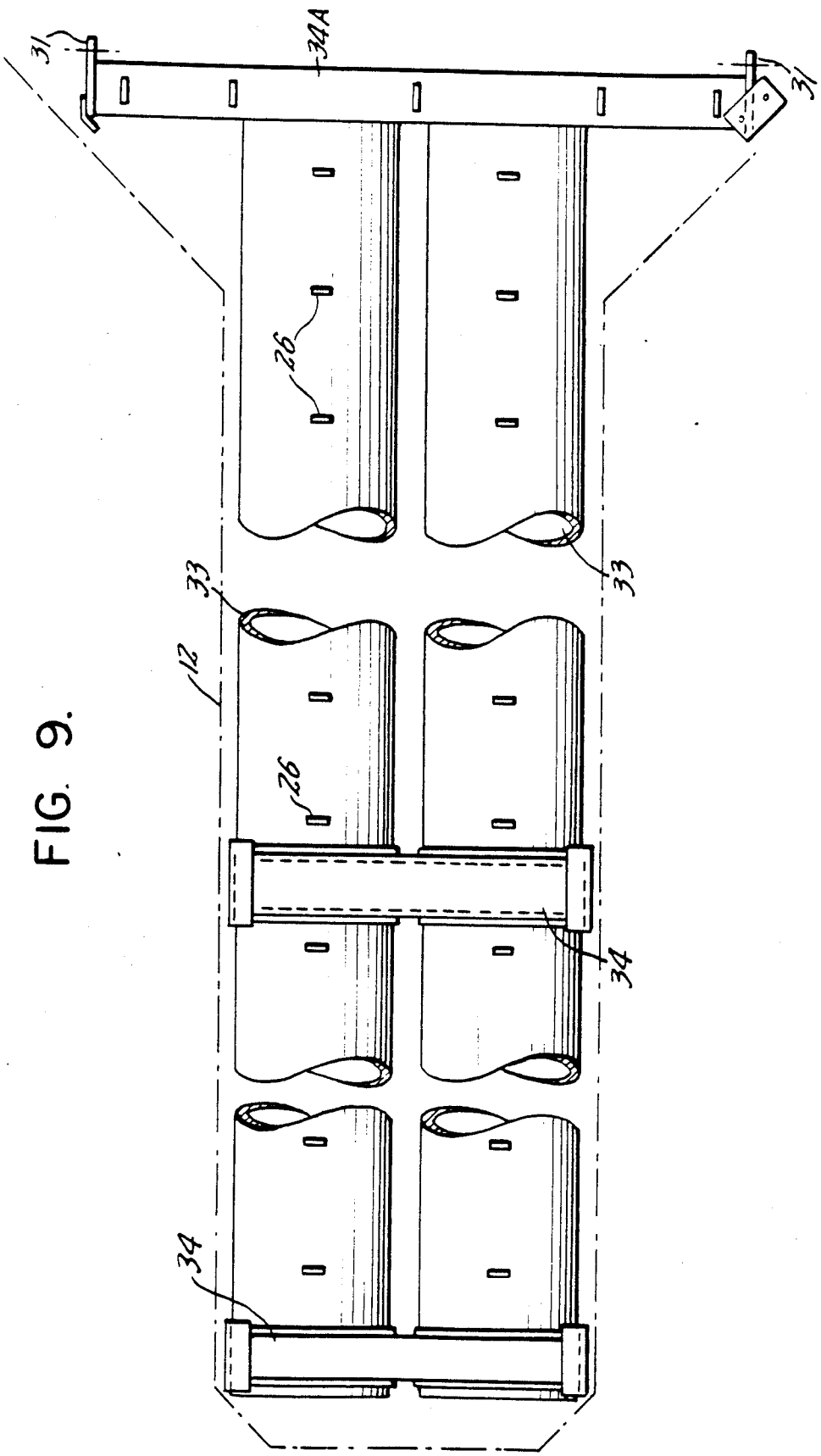

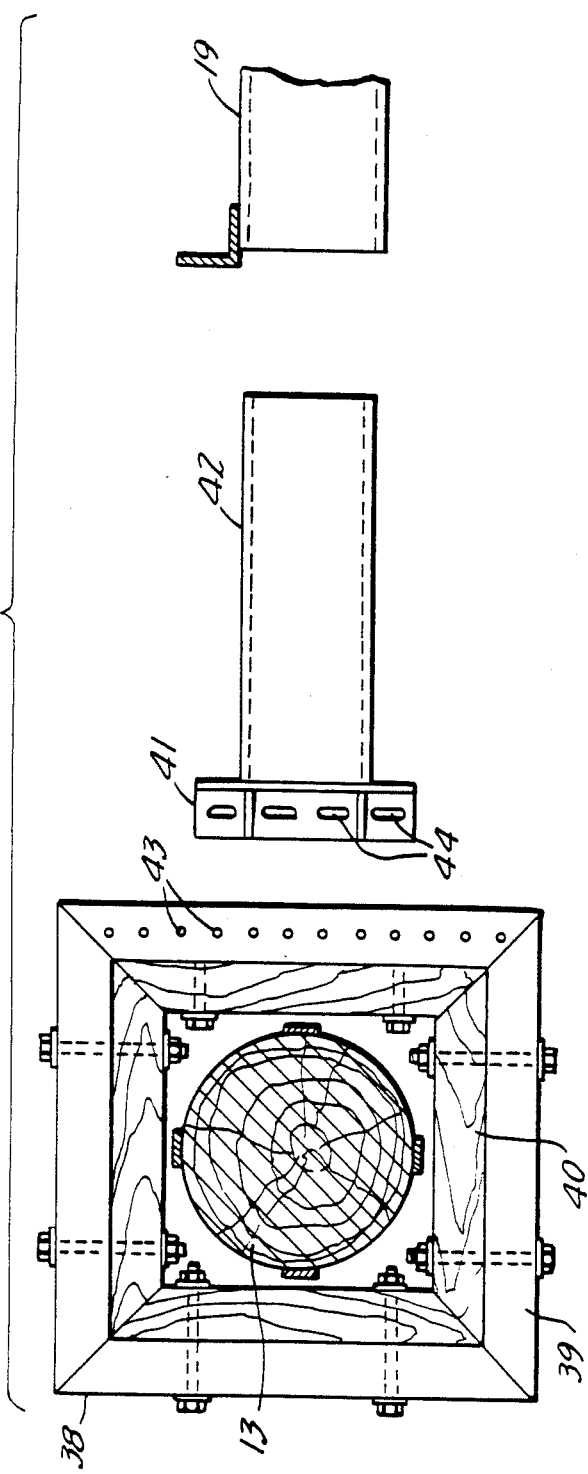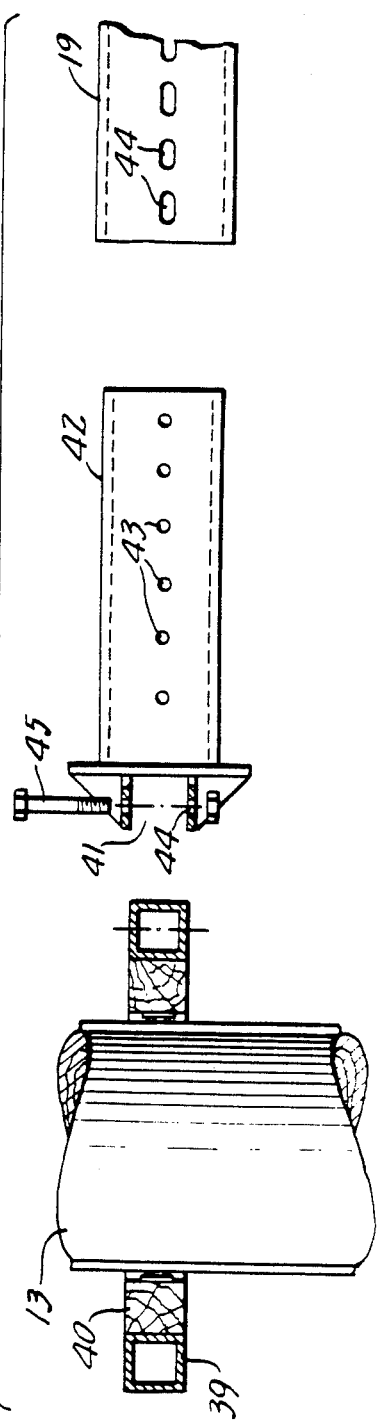
FIG. 11A.
FIG. 11B.

FLOATING DOCK SYSTEM

The present invention is directed to a floating dock system made of sturdy modules which can be designed to provide the needs of marinas having widely varying sizes, and which provides protection for boats under varying weather conditions and even in a substantial seaway while limiting the need for a large number of guide piles.

BACKGROUND OF THE INVENTION AND THE PRIOR ART

Man has wrestled with the problem of mooring boats almost from the times when he first ventured forth on the water astride a log. While it was possible in ancient times to simply drag boats up the beach when occupations such as fishing were completed, such an expedient is only conceivable in situations where plenty of manpower is available and would not be considered at all by a modern day yachtsman. In addition, such ancient schemes required a large amount of beach space, a commodity which is no longer available, especially in the crowded coastal regions of the present day.

Many methods for docking and mooring boats have bee devised including protected harbors having tide gates to guard against excessive tides, moles such as a Le Havre, fixed docks or piers to which boats can be tied up, and floating docks or piers, the field of the present invention. A floating dock system can provide mooring space for boats in areas which formerly were open water along with reduced land-based requirements. Floating docks must be somehow be prevented from floating away altogether, as by mooring ropes, anchors, guide piles, etc. The invention contemplates a system in which guide piles are employed, but in which fewer piles are required than in systems known to the inventors.

BRIEF STATEMENT OF THE INVENTION

The invention is directed to a floating dock system comprising a plurality of main dock modules of generally rectangular configuration, each module being comprised of a flotation unit, a deck unit, fastening means at the ends of the modules to secure modules together, guide means on at least one side of each module adapted to slidably engage a guide pile, and finger float means attached on at least one side of each dock module so as to form mooring slips between adjacent finger floats. In use, the assembled dock system floats up and down in contact with the guide piles in response to changes in water level such as those due to tides. The connections between the dock modules and between dock modules and finger floats are hinged horizontally, thereby contributing flexibility to the assembled structure in response to motion of the water surface. Desirably, the main dock modules are provided with a centrally located, covered utility trench which may be inspected along its entire length and power posts may be located at appropriate points along the main dock units to provide a power outlet at each slip created by the assembled dock structure.

BRIEF DESCRIPTION OF THE DRAWING

In the drawing:

FIGS. 6A and 6B, 7A and 7B depict alternative hinge designs for connecting main dock floats, in plan and sectional views respectively;

FIG. 9 depicts the float framing plan for a finger float as contemplated in accordance with the invention;

FIG. 10A depicts in cross-section the connection means between a finger float and a main dock float, while

FIGS. 11A and 11B depict in plan and cross-section views, respectively, the pile guide assembly;

DETAILED DESCRIPTION OF THE INVENTION

Figure 1:
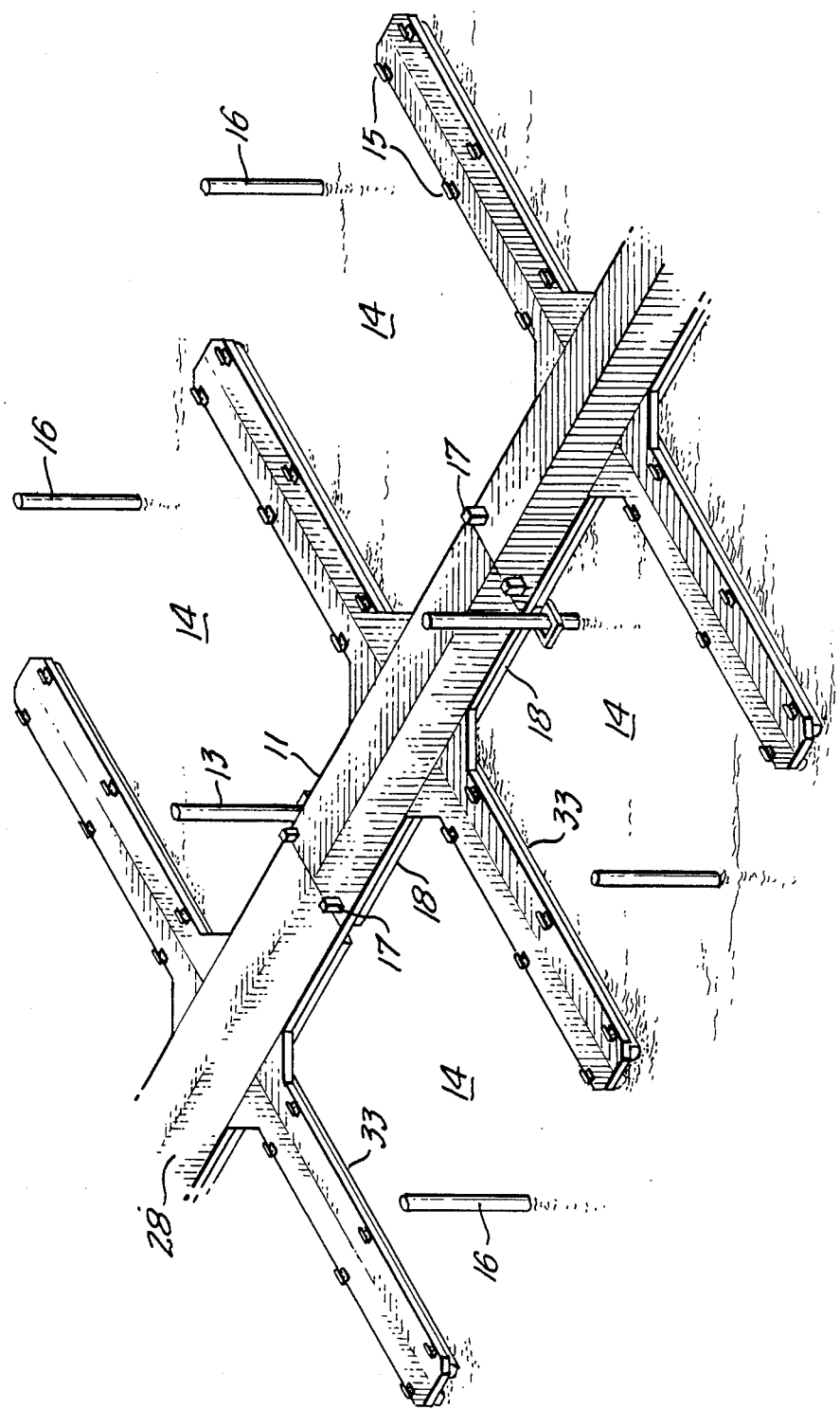
FIG. 1 depicts in isometric view a portion of a typical slip assembly provided in accordance with the invention.

The invention will now be described in conjunction with the drawings. It will be noted from FIG. 1 that the dock system contemplated in accordance with the invention comprises main dock float modules 11 which are interconnected at the ends and finger float modules 12 which are preferably connected perpendicularly to the main float 11 at a substantially amidships location thereon. The floating assembly is secured in slidable relation to guide piles 13 and the whole assembly rides up and down on the guide piles as required by tidal action or other change in water level on which the assembly is floating. Mooring slips are indicated at 14 and boats may be secured to each side of the finger piers 12 by means of cleats 15. Docking piles 16 may be used to assist in docking maneuvers. Power posts 17 may be provided at each slip. The various units of the assembly are preferably connected by means of hinge connections, thereby providing a substantial flexibility to the assembly which permits ready and free response to local water motion and reduces the chance of wave action wetting the dock surfaces. The assemblage provides an exceptionally clean profile as compared to other dock designs and boats moored alongside the finger piers are accessible along the entire lengths thereof. If needed, guide piles can also be placed at the ends of the finger piers. Deck planking 28 may be laid down in a herringbone pattern as shown, although other patterns may be used.

Figure 2:
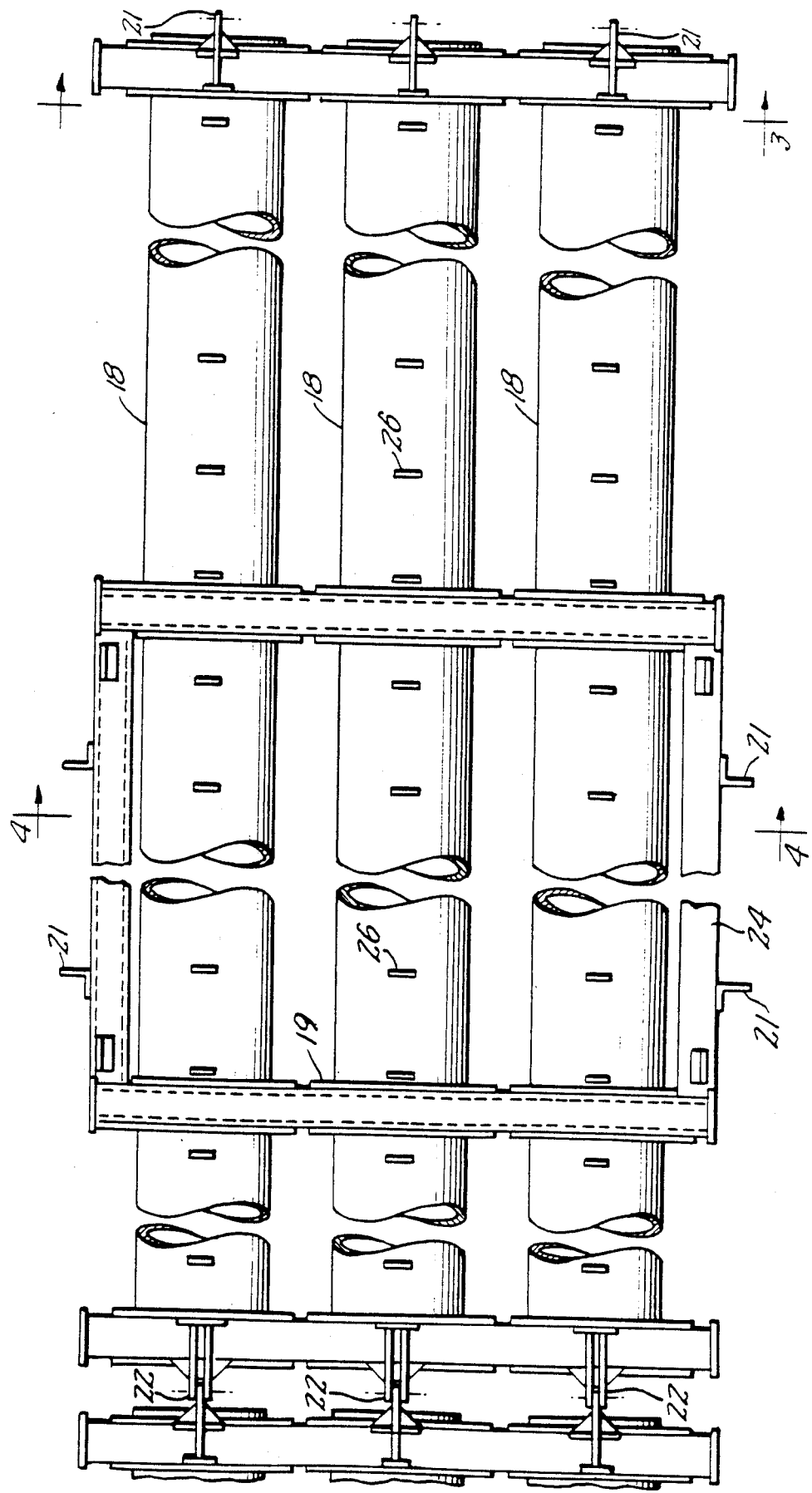
FIG. 2 depicts the float framing plan for a main dock float provided in accordance with the invention.
Figure 3:
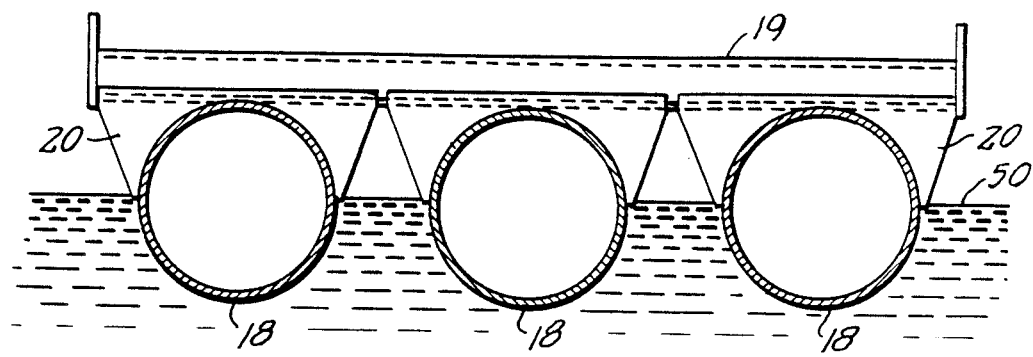
FIG. 3 depicts a cross-section of a main dock float as indicated in FIG. 2.
Figure 5A:
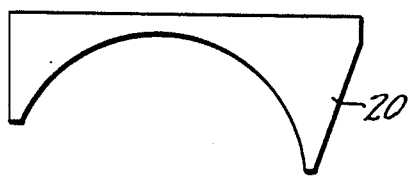
FIGS. 5A and 5B depict bracket designs for connecting float tanks with transverse members.
Figure 5B:
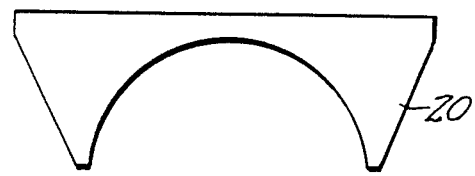
Figure 4:
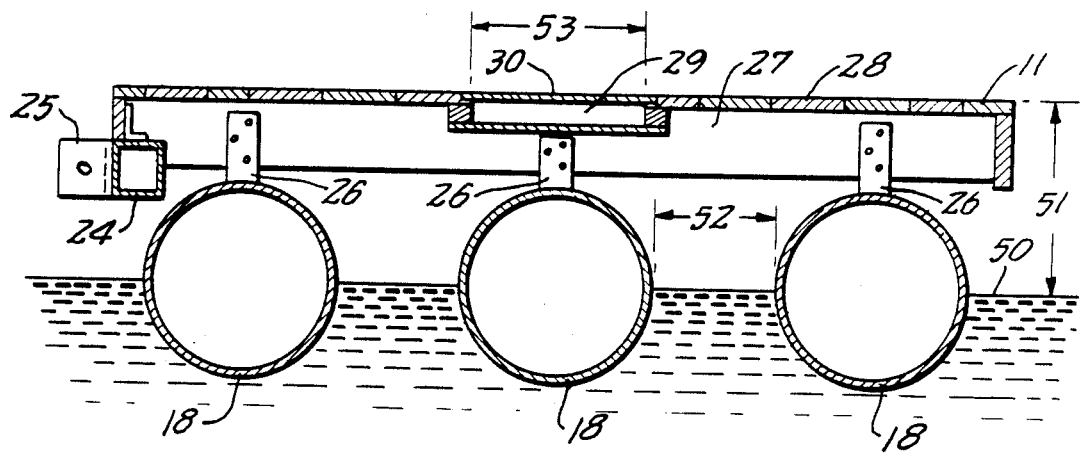
FIG. 4 depicts another cross-section of a main dock float as indicated on FIG. 2.
Figure 8:
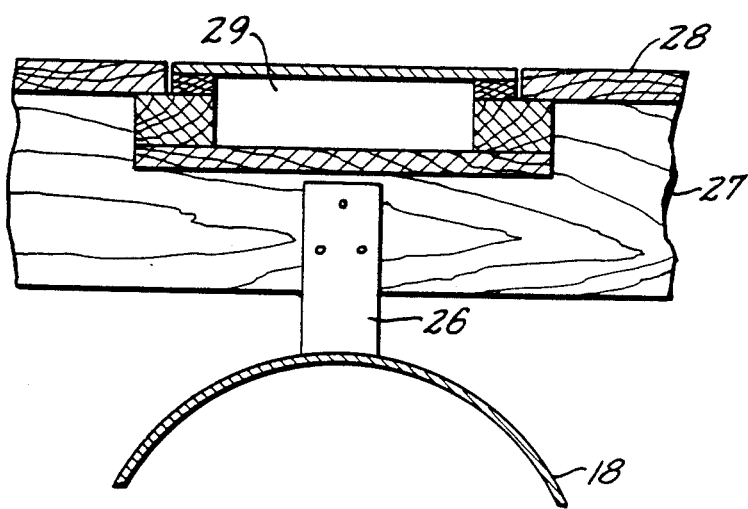
FIG. 8 depicts the cross-section of the utility trench and its relation to the main dock framing and a float tank.

The float framing plan for a main float is depicted in FIG. 2. In FIG. 2, the flotation unit is depicted as three parallel cylindrical steel tanks 18 held in spaced relation by beams 19, which preferably are box beams. Beams 19 are fastened to tanks 18 by brackets 20, preferably by welding. This is detailed in FIG. 3, taken at Section A of FIG. 2. As shown in FIG. 3, and also in FIG. 4, tanks 18 preferably float so that the waterline 50 is substantially at the horizontal diameter of tanks 18. Tabs 26 can be made of the length desired to produce a required freeboard 51. Freeboard 51 can thus be provided at the height required to service any size of boat. Beams 19 at the ends of tanks 18 bear hinge parts 21 and 22, which may be respectively, male and female parts. As shown in more detail in FIGS. 6A and 6B, 7A and 7B, the hinge parts may each bear an eye 23 located outboard the ends of main float 11. The hinge is completed by inserting a pin through matching eyes of hinge parts 21 and 22. Transverse beams 19 located inboard the ends of the main float 11 extend outboard of tanks 18 and hold longitudinal beams 24 which support finger float hinge parts 25. A series of steel tabs 26 are welded at intervals along the top of tanks 18 (see also FIGS. 4 and 8) to which the decking is attached. The deck structure includes joists 27 which are fastened to tabs 26 and the deck planking 28 (again see FIG. 8) is attached to the joists 27. As shown more particularly in FIG. 8, a utility trench is framed into the joists and decking, preferably over the center tank and is provided with a cover 30. Designs of brackets 20 are detailed in FIGS. 5A and 5B.

Hinge designs are detailed in FIGS. 6(A and B) and 7(A and B), which show the ends of tanks 18 and beams 19 as well as sectional views of brackets 20. It will be appreciated that hinge parts 31 may be substantially identical, and may be used in pairs to form a female hinge, with a single hinge part forming the male hinge. The hinge parts are firmly welded to beams 19 and stabilizers 32 of various shapes may be used to resist bending moments applied to hinge parts 31 in use.

The float framing plan for a finger pier is depicted in FIG. 9 which shows two tanks 33 held in parallel spaced relation by transverse beams 34 welded to brackets 35 which are in turn welded to tanks 33 in a manner similar to that employed in fastening main pier 11 together. Inboard finger beam 34 is made substantially longer, e.g., approximately twice the length of the outer finger transverse beams 34 to provide an improved lever arm preventing the outboard end of the finger pier from wandering when the hinge parts 21, preferably fastened to the outboard ends of beam 34 are docked to the hinge parts 21 fastened to longitudinal outboard beam 24 fastened to main float 11. Tabs 26 welded to tanks 33 support transverse joists and deck planking similar to the manner described in connection with the main float shown in FIG. 2.

Figure 10A:
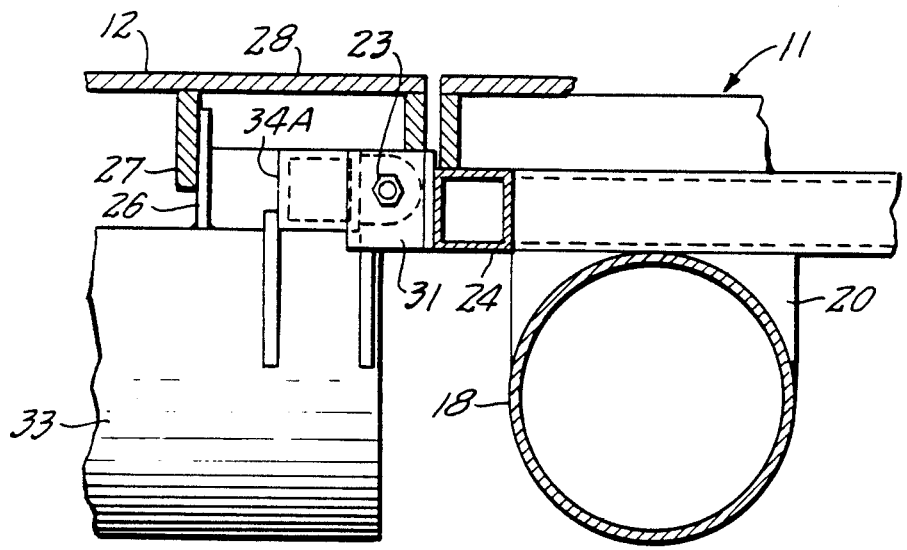
Figure 10B:
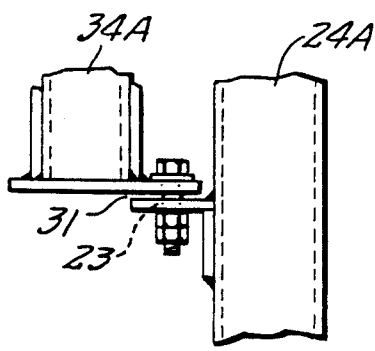
FIGS. 10B and 10C depict sectional views of the hinge therebetween.
Figure 10C:
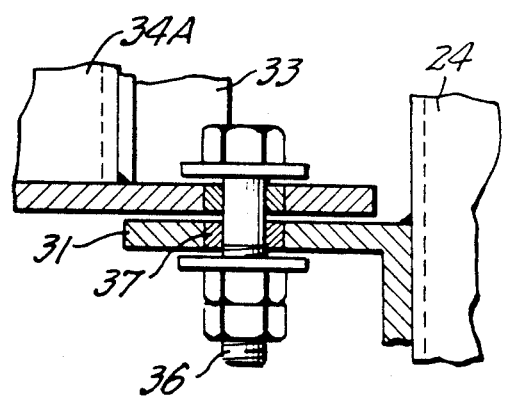

FIG. 10A depicts in cross-section the attachment of a finger pier 12 to a main float 11. Main tank 18 and finger tank 33 are shown, together with transverse beam 34A in the finger pier and longitudinal beam 24 on the main float 11. Tabs 26, joists 27 and decking 28 are also shown. Hinge parts 31 located on the finger pier and main float 11 respectively cooperate to form a hinged connection between the two units by insertion of a bolt 36 through the eye 23 in the hinge parts. This is depicted more particularly in FIGS. 10B and 10C which are views of the hinge connector detail.

It is found that, in use, the bolt 36 and eye 23 are subjected to a fretting type corrosion. This is mitigated in relation to the hinge eye by use of a stainless steel bushing 37 in the hinge eye (see FIG. 10C). In this way, wear is principally experienced in the bolt, which is relatively inexpensive, is accessible, and is relatively easy to replace. It is noted that maintaining the hinges as high as possible above the water line helps mitigate incidental wetting and resultant corrosion and enables easy inspection of the wear parts in the hinge. As shown in FIG. 10A, it is desirable that the decking levels on the main and finger piers be as close to the same plane as possible. This may be accomplished by ballasting the tanks with water, as required by loadings on the various modules.

It is to be appreciated that the driving of piles into the bottom of a river or lake is attended with some difficulty, a matter which can be exacerbated by weather conditions and water depth. The pile driver is usually mounted on a float or barge which will move about depending upon factors such as wave action, wind, motion of the driver itself, etc. These factors all contribute to variations in actual location of a pile with respect to the exact point at which it was desired to be driven. A particular pile may be six inches to a foot or even more removed from the point called for by the plan. The pile guide assembly 38 shown in plan view in FIG. 11A and in section in FIG. 11B is designed to mitigate the problem of the mislocated pile. Pile guide assembly 38 comprises a frame 39, usually made of steel and with an inner sacrificial and replaceable lining 40 (which may be wood) therein which fits adjustably in jaw 41 which is in turn mounted on shank 42. Frame 39 is adjustable longitudinally with respect to the float on which it is mounted as by the system of bolt holes 43 in the frame and slotted holes 44 in the jaw through which bolts 45 may be passed to lock frame 39 in jaw 41. The shank 42 is provided with bolt holes 43 therethrough which fit slotted holes 44 in transverse beam 19 as shown in FIG. 11B to provide adjustment in the transverse direction. In this instance, it is advantageous to employ square-section box beams as transverse beams 19 and provide a square-section shank 42 which fits snugly within the hollow section of beam 19. A guide pile section 13 is shown in FIGS. 11A and 11B.

Figure 12:
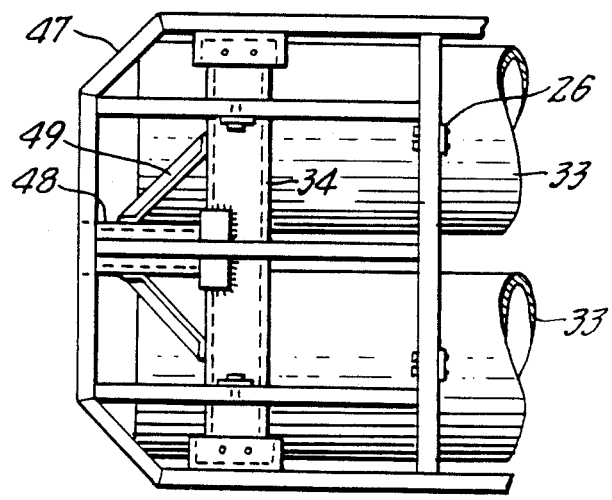
FIG. 12 depicts the end detail for finger floats having pile guides at the end.

At times it may be desirable to provide a guide pile at the outboard end of finger float 12. In such a situation, an end structure as shown in FIG. 12 may be employed. In FIG. 12, tanks 33 are shown with a transverse beam 34. A framework 47 is fastened above and about the tanks and is fastened to beam 34. A box section 48 supported by framework 47 and stabilizers 49 and adapted to receive a pile guide assembly 38 is provided so that additional support by means of a guide pile can be provided at the end of the finger pier.

For purposes of transportation and handling, the float units are made as handleable modules. It will be appreciated that, where desired, the finger floats may be made in sections, in which case appropriate locating fingers and longitudinal fasteners may be employed.

Preferably, all edges of the finger piers and main float modules described hereinbefore are provided with fenders to protect the sides of boats moored thereagainst. Such fenders may extend the entire lengths of the finger piers and may be of inflatable waterproof fabric, synthetic sheet, etc., which are flexible. Boats moored to finger piers are readily accessible along the entire length thereof, a feature lacking in many marina designs. The fact that only a few guide piles are required in accordance with the invention provides the assembled floating dock with a clean, uncluttered appearance which is in strong contrast to the seeming forest of piling found in many other systems.

The floating dock of the invention may be made to have substantial size, stability and load carrying capacity. For example, floats or tanks 18 may be made of 30-inch diameter spiral welded pipe, a material used in oil-field goods and for other purposes. The lateral spacing 52 between the tanks 18 (See FIG. 4) may be a variable depending on the permissible width 53 for the pier 11. For example, with three 30-inch diameter tanks 18 width 53 may be 10 feet, 12 feet or greater. The narrow width possible while still providing stability and load carrying capacity is an important environmental safeguard.

It is to be appreciated that with other dock systems it is not possible to deliver a required power supply to the end of a long pier when there are numerous power loads applied along the way. With the present system. Transformers 17 may be provided along the dock, each supplied along utility trench 29, thereby enabling adequate power supply to each slip. Transformer of the capacity desired can weigh 2000 pounds or more. Such a weight is readily accommodated by the structure of the invention. Dock systems using styrofoam flotations would need to be 30 feet or more wide to accommodate such weight. Floating docks 30 feet wide are unacceptable environmentally.

The stability and load-carrying capacity made possible in accordance with the invention is important from the public safety aspect. Pedestrians walking along the dock and the finger pier do not cause deflection of the structure, thereby decreasing the risk of falling, etc.

Figure 13:
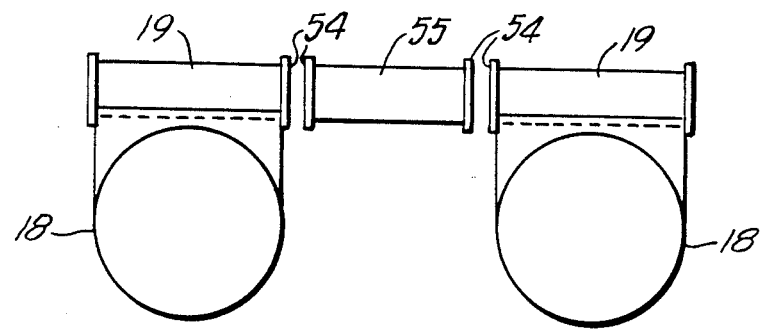
FIG. 13 depicts a modular construction of the float and transverse beam which permits assembly-type construction and saves on shipping costs.

In another aspect of the invention, the float tank 18 and transverse beam 19 can be assembled as modular units as shown in FIG. 13. Flanges 54 on the ends of beams 19 may be joined to flanged spacers 55 by bolts or the like, spacers 55 having any convenient length. This modular version greatly saves space in shipping.

Figures 14, 14A:
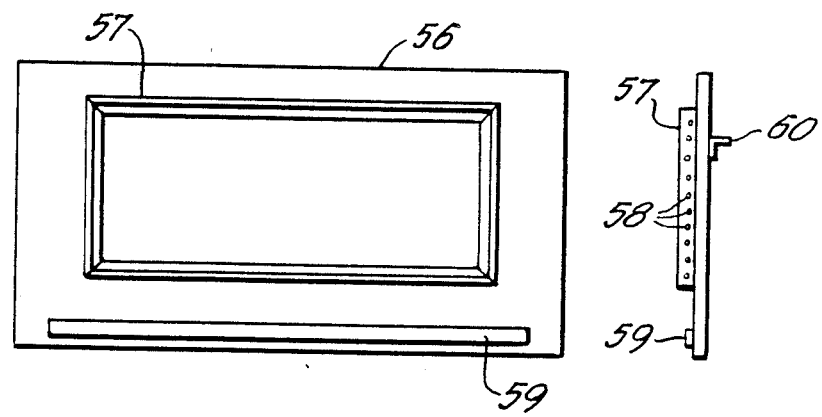
FIG. 14 depicts a diving plane stabilizer construction to stabilize motion of a dock structure in a seaway.

It has been found that motion of the dock in a seaway can be effectively dampened by means of an eccentrically loaded diving plane or plate suspended in the water below an end or edge of dock 11 or finger pier 12 by chains or cables as illustrated in FIG. 14. The diving plane shown is a steel plate 56 which may, for example, be about 4′ by 8′ with a stiffening frame 57 bearing holes 58 to which suspending chains may be attached by means of shackles or the like. Desirably, four chains are used, and the suspending chains ar attached at the other end to beams 19 of the float such that the plate 56 is normally in horizontal position. Plate 56 is loaded eccentrically by weight 59. As the float to which the diving plane is attached digs due to wave action, the weighted side of plate 56 drops. Then, as the float starts to rise, the chains press against plate 56 and the motion of the float is effectively snubbed. Tripper angle iron 60, which may extend partly or completely across plate 56 assists in tripping the plate due to wave action.

It will be appreciated that the tanks 18 will be cleaned and painted inside and out for protection and may be coated with anti-fouling paint if necessary. Pumps may be provided to add or remove ballast as needed. Industrial zincs can be employed to reduce corrosion.

What we claim is:

1. A floating dock system comprising:
a plurality of main dock float modules each including main dock flotation means, main dock deck means operably associated with said main dock flotation means and main dock fastening means to fasten a pair of said main dock flotation means together endwise;
guide means located at a side of one or more of said main dock float modules to engage a guide pile in slidable relation; and
finger float modules fastened substantially perpendicular to at least two or more of said main dock float modules to form a mooring slip between said finger float modules, each said finger float module including finger flotation means, finger deck means operably associated with said finger flotation means, and finger fastening means for fastening each said finger flotation means to one of said main dock flotation means, said main dock fastening means and said finger fastening means each forming a hinge when said main dock float modules and said finger float modules are in a fastened position.

2. The floating dock system in accordance with claim 1 wherein each said main dock flotation means comprises a plurality of cylindrical steel tanks being fastened rigidly together in parallel relation, each of said tanks being provided with a set of upwardly extending tabs welded to said tanks so that said main dock deck means is operably associated to said main dock flotation means.

3. A floating dock system which comprises:
a plurality of substantially rectangular main dock float modules;
a deck unit;
fastening means at each end of said main dock float module to secure one said main dock float module to an adjacent main dock float module;
guide means attached to a side of at least one said main dock deck module to slidably engage a guide pile; and
at least one finger float module attached at substantially amidships location on at least one side of one said main dock float module, each said main dock float module including a plurality of cylindrical steel tanks extending substantially the length of each said main dock float module and being fastened rigidly together in parallel relation, each of said tanks being provided with a set of upwardly extending tabs welded to said tanks so that said deck unit may be fastened to said tabs, said tanks being fastened together in rigid spaced relation by brackets welded atop said tanks, said brackets being welded to box beams extending athwartship of said tanks, said box beams bearing hinge plates provided with hinge pin holes located outboard the ends of said tanks.

4. The floating dock system in accordance with claim 3 which further comprises a finger float mooring hinge means for attaching said finger float module of one said main dock float module, said finger float mooring hinge including a parallel mounted box beam bearing hinge plates having hinge pin holes located outboard the side of said tanks, said parallel mounted box beam being welded in place on a substantially central location on at least one side of said main dock float module.

5. The floating dock system in accordance with claim 4 wherein said finger mooring hinge means are provided on both sides of at least one said main dock float module and are fastened to said tanks by brackets welded to said tanks and athwartship beams welded to said brackets and to the ends of said box beam bearing said hinge plates.

6. The floating dock system in accordance with claim 3 wherein each said finger flotation module comprises at least one longitudinally extending steel tank having a set of upwardly extending tabs welded to said tank so that said deck means may be fastened to said tabs, and a beam bearing a hinge plate having hinge pin holes located outboard the end of said tank and being rigidly fastened to said tank.

7. The floating dock system in accordance with claim 3 which further comprises pile guide means adjustable in two directions and insertable in the end of at least one of said beams.

8. The floating dock system in accordance with claim 3 wherein apron means are disposed substantially along the entire length of said finger float module to protect the side of a boat moored in a slip formed by said finger float module.

9. The floating dock system in accordance with claim 4 wherein each of said hinge pin holes is bushed with a stainless steel bushing.

10. The floating dock system in accordance with claim 3 which further comprises pile guide means including a frame adapted to fit slidably about said guide pile, said frame being mounted adjustably to a jaw, said jaw being mounted on a shank adjustably mounted to said main dock float module.

11. THe floating dock system in accordance with claim 3, wherein each of said cylindrical steel tanks is provided with flanged beam units attached to said tanks by brackets, each said flanged beam unit being slightly longer than the diameter of said cylindrical steel tanks and being attachable to a spacer unit to form said main dock float module.

* * * * *